United States Patent [19]
Ito et al.

[11] Patent Number: 5,170,334
[45] Date of Patent: Dec. 8, 1992

[54] BYPASS-PAIR CONTROL APPARATUS FOR THYRISTOR BRIDGE

[75] Inventors: Katsuro Ito; Teruo Yoshino, both of Tokyo, Japan

[73] Assignee: Kabushiki Kaisha Toshiba, Kawasaki, Japan

[21] Appl. No.: 774,848

[22] Filed: Oct. 11, 1991

[30] Foreign Application Priority Data

Oct. 12, 1990 [JP] Japan ................................. 2-272210

[51] Int. Cl.⁵ ........................................ H02M 7/145
[52] U.S. Cl. ....................................... 363/96; 363/54;
363/58; 363/86; 363/87; 363/136; 307/644
[58] Field of Search ...................... 363/54, 57, 58, 85,
363/86, 87, 96, 135, 136; 307/630, 640, 644

[56] References Cited
U.S. PATENT DOCUMENTS

| | | | |
|---|---|---|---|
| 3,636,431 | 1/1972 | Machida et al. | |
| 4,313,156 | 1/1982 | Kobayashi et al. | 363/54 |
| 4,320,445 | 3/1982 | Kobayashi et al. | 363/54 |
| 4,621,314 | 11/1986 | Ito | 363/54 |
| 4,680,691 | 7/1987 | Yoshino et al. | 363/51 |
| 4,859,884 | 8/1989 | Yoshino | 307/646 |

FOREIGN PATENT DOCUMENTS

1262257 10/1989 Canada.
0142096 5/1985 European Pat. Off..
62-49828 10/1987 Japan.

Primary Examiner—Steven L. Stephan
Assistant Examiner—Adolf Berhane
Attorney, Agent, or Firm—Oblon, Spivak, McClelland, Maier & Neustadt

[57] ABSTRACT

In a control apparatus for controlling the firing timing of each of thyristor valves constituting a thryistor bridge by use of at least two series of control systems, a bypass-pair control circuit for thyristor bridge includes a circuit for detecting the conduction states of the thyristor valves, and a circuit for determining a conductive valve at the time of bypass-pair operation in accordance with a result of detection of the conduction state of each thyristor valve.

9 Claims, 10 Drawing Sheets

BYPASS-PAIR CONTROL APPARATUS FOR THYRISTOR BRIDGE

BACKGROUND OF THE INVENTION

1. Field of the Invention

This invention relates to a bypass pair control apparatus for a thyristor bridge used in an AC/DC power coupling system of, for example, a DC power transmission system.

2. Description of the Related Art

In an AC/DC coupling system using power converters constructed by thyristor bridges, the control system thereof may sometimes effect an operation called a bypass-pair (hereinafter referred to as BPP) when the system is triggered or stopped or an accident has occurred therein (cf. Japanese Patent Publication (koukoku) No. 62-49828, for example). A BPP indicates a condition that a high voltage side valve (e.g., X-phase valve) and a low voltage side valve (e.g., U-phase valve) of the thyristor valves, which constitute the thyristor bridge of the power converter and which are connected to the same phase (e.g., R phase), are set in the conduction state at the same time.

Figure 1A:
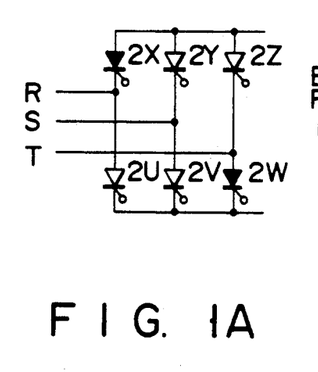
FIGS. 1A and 1B are diagrams explaining the bypass operation.
Figure 1B:
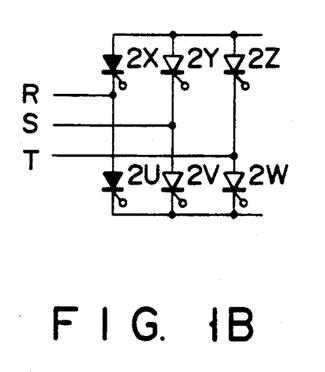

There are some methods of determining a valve which is set to be a BPP. For instance, a BPP can be set by applying a firing pulse to a valve which comes next but one to a valve which has been supplied with a firing signal (PHS signal) in the last cycle according to a normal firing sequence before the BPP is set up. Such BPP setting is explained with reference to FIGS. 1A and 1B. More specifically, if the valve supplied with the PHS signal in the last cycle is valve 2W of FIG. 1A, a PHS signal is supplied to valve 2U to trigger valve 2U of FIG. 1B. Then, valves 2U and 2X are set into the BPP.

Further, in order to prevent the entire system from being made inoperative when an accident has occurred in the control system, two series of control systems are often used (duplex system) to enhance the reliability of the system operation.

However, when a duplex system containing A and B series is adapted to the control system, the following problem may occur. Control systems A and B are basically of the same construction. However, because of variations in the characteristics of electrical parts used in a phase control circuit and PLL circuit constituting each of the control systems, a difference will occur in the generation timing of PHS signals which are the outputs of the control systems.

Therefore, it is possible that control system A outputs a PHS signal to valve 2W immediately before the BPP operation is started, but control system B does not output a PHS signal to valve 2W. At this time, control system A tends to set valves 2U and 2X into the BPP operation, but control system B tends to set valves 2V and 2Y into the BPP operation.

In the above case, the actual BPP valves do not match the corresponding bypass-pair command generated by either of the control systems. Otherwise, there may occur a problem that the BPP operation is not started and valves 2U and 2Y or valves 2V and 2X are kept in the conduction state.

SUMMARY OF THE INVENTION

An object of this invention is to provide a bypass-pair control apparatus for thyristor bridges in which BPP commands for respective duplex control systems can be made coincident with each other, so that thyristor valves can effect a normal BPP operation.

In order to attain the above object, a bypass-pair control apparatus of the present invention, which controls the firing timing of each thyristor valve in a thyristor bridge formed of a plurality of thyristor valves by use of at least two control systems, comprises means for detecting the conduction state of each thyristor valve; and means for determining a to-be-conducted valve at the time of bypass-pair operation based on the detected conduction state of each thyristor valve.

According to this invention, a to-be-conducted valve at the time of bypass-pair operation is determined based on the result of detection of the conduction state of each thyristor valve, to thereby avoid a problem that actual bypass-pair valves are different from valves specified by the BPP command of one of the control systems, or a normal BPP state cannot be set up.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE PREFERRED EMBODIMENTS

Figure 2:
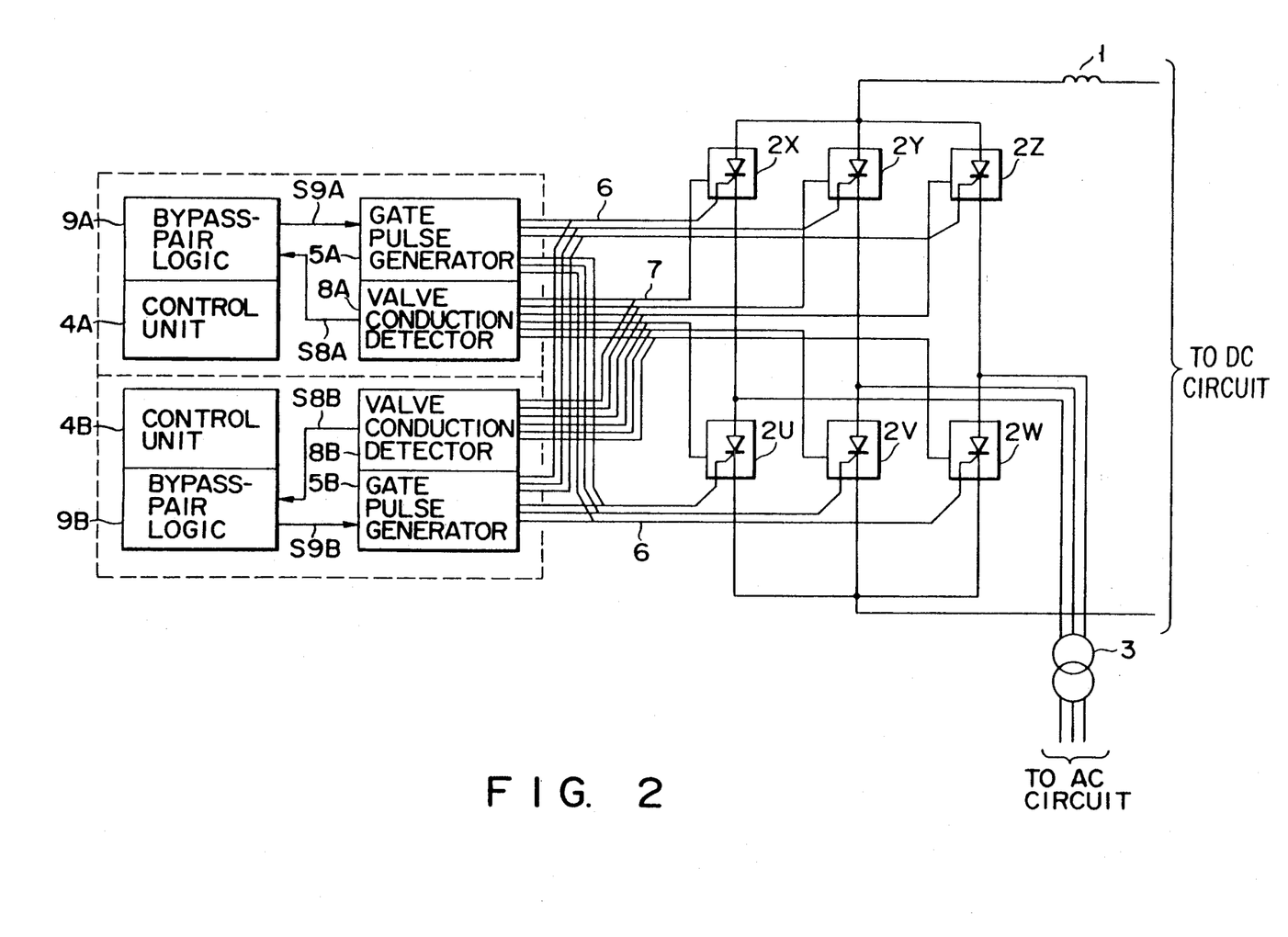
FIG. 2 is a block diagram showing the construction of a main portion of a bypass-pair control apparatus according to an embodiment of this invention.

There will now be described an embodiment of this invention with reference to the accompanying drawings. FIG. 2 shows one embodiment of this invention, and indicates one of paired AC/DC converters included in an AC/DC power coupling system used in, for example, a DC power transmission system. In FIG. 2, the reference numeral 1 denotes a DC reactor; 2U, 2V, 2W, 2X, 2Y, and 2Z, thyristor valves; 3, a 3-phase transformer for converter; 4A and 4B, control units for determining the firing timings of respective thyristor valves; and 5A and 5B, gate pulse generators for respectively supplying firing commands 6 (gate pulses) to thyristor valves 2U to 2W and thyristor valves 2X to 2Z in response to commands S4A and S4B (PHS signals) from control units 4A and 4B.

Control units 4A and 4B and pulse generators 5A and 5B are formed in a duplex configuration including A- and B-series, and even if one-side series (for example, 4A; 5A) becomes defective, the AC/DC power coupling system can be correctly and continuously operated by interrupting the operation of the abnormal series (A) and using the remaining normal series (B).

Further, thyristor valves 2U to 2Z are constructed to receive signals from A- and B-series pulse generators 5A and 5B via OR circuits, and in this embodiment, the OR circuits are constructed by 2-branch light guides (optical fibers) 6.

As shown in FIG. 2, valve conduction detectors 8A and 8B for checking whether or not thyristor valves 2X to 2Z and 2U to 2W are actually set in an ON state are provided. Monitor signals (VCS-U to VCS-Z) for checking whether or not thyristor valves 2X to 2Z and 2U to 2W are set in the ON state are transmitted via optical fibers 7. The monitor signals can be created based on arm currents of valves 2X to 2Z and 2U to 2W, gate pulses of these valves, or voltages applied across the respective valves.

Figure 3:
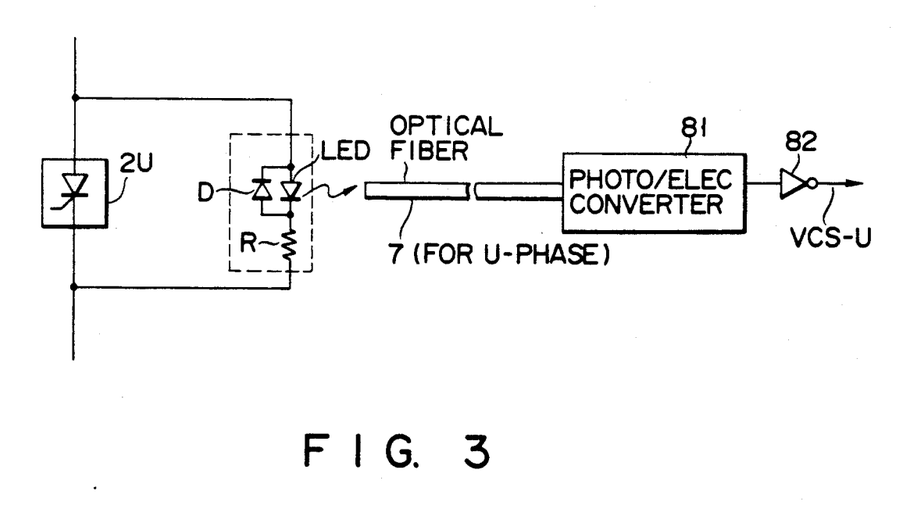
FIG. 3 is a circuit diagram showing an example of a valve conduction detector (8A/8B) in FIG. 2.

The valve conduction detector (8A/8B) can be constructed as shown in FIG. 3, for example. In this example, an LED is turned on when the U-phase valve is set in the nonconduction state and the LED is turned off when the U-phase valve is set in the conduction state. When the valve is set in the conduction state and the LED is turned off, an output of photo-electric converter 81 constructed by a photodiode or the like is set to "0" level, and U-phase conduction signal VCS-U of high level "1" is output from inverter 82.

The same structure as that described above is provided for each phase of V, W, X, Y, and Z, so that a conduction signal (VCS-V, VCS-W, VCS-X, VCS-Y, VCS-Z) corresponding to each phase of the valve which is set in the conduction state is output. That is, the valve conduction detector (8A/8B) includes 6 sets of circuits having the same construction as the circuit shown in FIG. 3, and six signals VCS-U to VCS-Z are supplied as the conduction signals (S8A/S8B) to bypass-pair logic circuits (9A/9B), each of which is part of a phase control circuit (not shown) associated with each control unit 4A/4B.

As described before, since two-series of control units 4A and 4B are provided, a difference may occur between the properties or characteristics of the control units, and the generation timings of PHS signals (S4A, S4B) which are output signals of control units 4A and 4B may become different from each other.

Since each arm is provided with each of thyristor valves 2U to 2Z, the turn-on or turn-off operation is actually effected at timings according to the command of one of the A-series of control unit 4A and pulse generator 5A and B-series of control unit 4B and pulse generator 5B.

In this example, the conduction state of each of thyristor valves 2U to 2Z is monitored by use of monitor signals from optical fibers 7, and the monitor signals are input to valve conduction detectors 8A and 8B. Then, detectors 8A and 8B supply valve conduction signals (VCS-U to VCS-Z), indicating which valve of the arms in the thyristor bridge is set in the conduction state, to bypass-pair logic circuits 9A and 9B. With the above construction, control units 4A and 4B of A- and B-series can always correctly detect which one of the valves is set in the conduction state.

Figure 4:
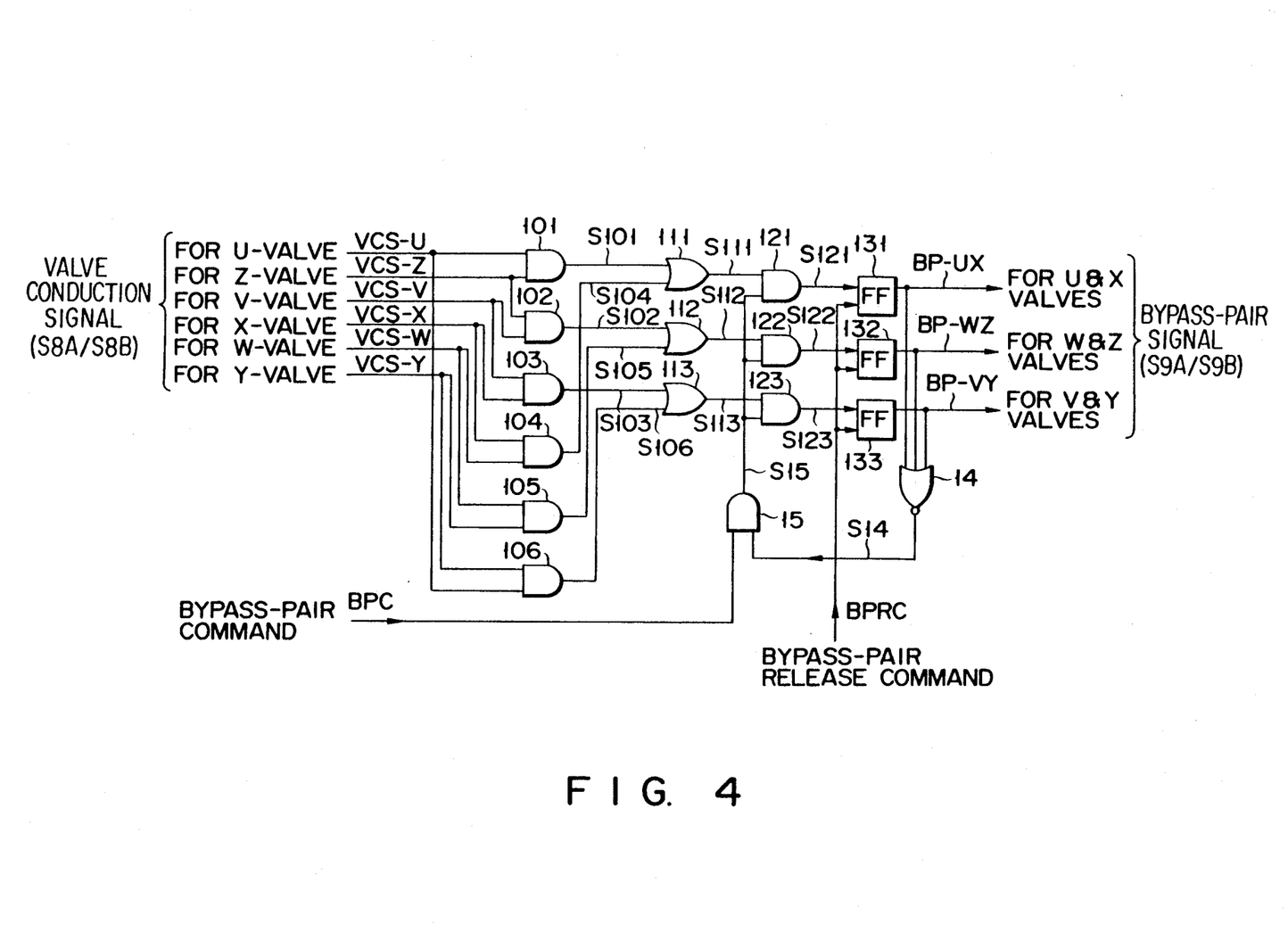
FIG. 4 is a circuit diagram showing an example of a bypass-pair logic (9A/9B) in FIG. 2.

In control units 4A and 4B, a valve to be set into the bypass-pair operation is determined by the circuit shown in FIG. 4.

FIG. 4 shows an example of the bypass-pair logic circuit (9A/9B). In FIG. 4, AND gate 101 receives signals VCS-U and VCS-Z, AND gate 102 receives signals VCS-Z and VCS-V, AND gate 103 receives signals VCS-V and VCS-X, AND gate 104 receives signals VCS-X and VCS-W, AND gate 105 receives signals VCS-W and VCS-Y, and AND gate 106 receives signals VCS-Y and VCS-U.

Outputs S101 and S104 of AND gates 101 and 104 are input to OR gate 111, outputs S102 and SI05 of AND gates 102 and 105 are input to OR gate 112, and outputs S103 and S106 of AND gates 103 and 106 are input to OR gate 113.

Outputs S111, S112, and S113 of OR gates 111, 112, and 113 are input respectively to one-side input terminals of AND gates 121, 122, and 123. The other input terminals of AND gates 121, 122, and 123 are supplied with output S15 of AND gate 15.

Flip-flops 131, 132, and 133 are set by outputs S121, S122, and S123 from AND gates 121, 122, and 123. Outputs BP-UX, BP-WZ, and BP-VY of set flip-flops 131, 132, and 133 are supplied as bypass-pair signals (S9A or S9B). Flip-flops 131, 132, and 133 are reset by given bypass-pair release command BPRC. Outputs BP-UX, BP-WZ, and BP-VY are input to NOR gate 14. Output S15 is obtained at AND gate 15 by performing a logical AND operation of output S14 from NOR gate 14 and bypass-pair command BPC.

Figure 5:
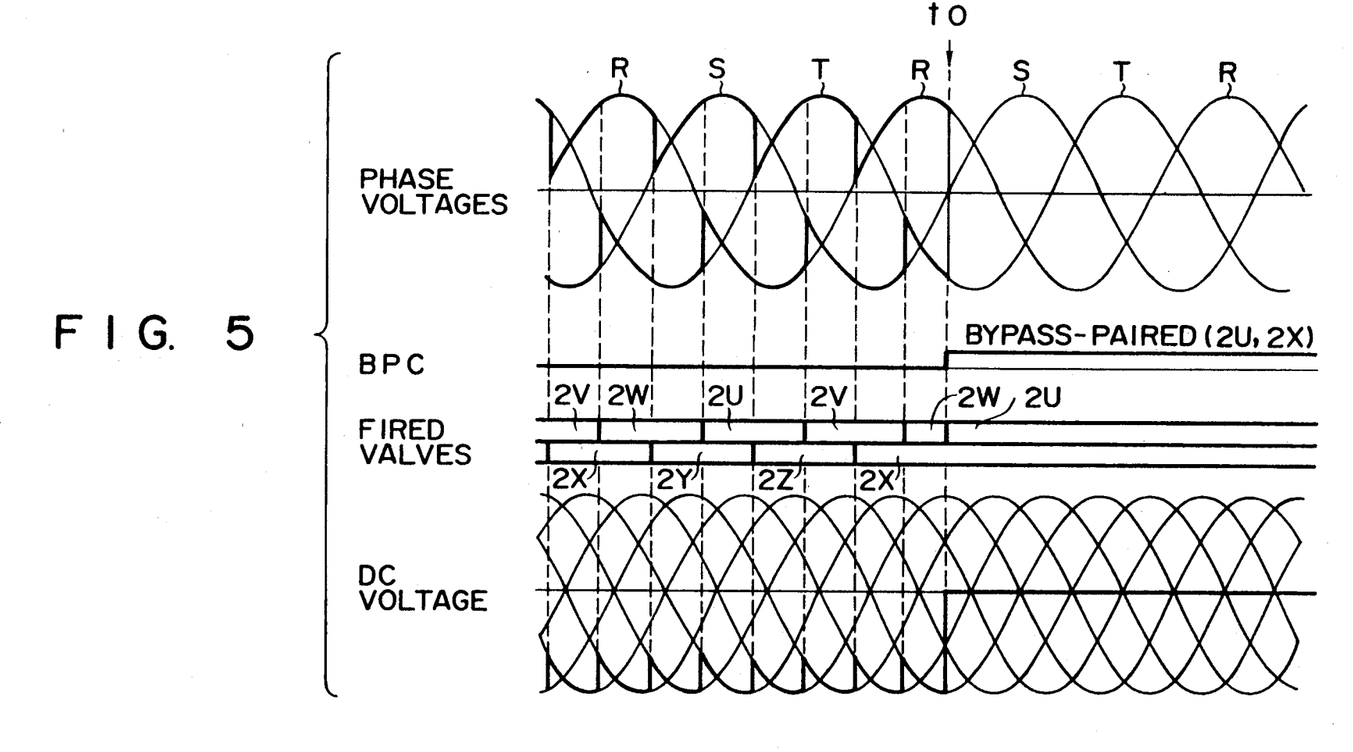
FIG. 5 is a waveform diagram for explaining a bypass-pair operation of the circuit shown in FIG. 4.
Figure 6:
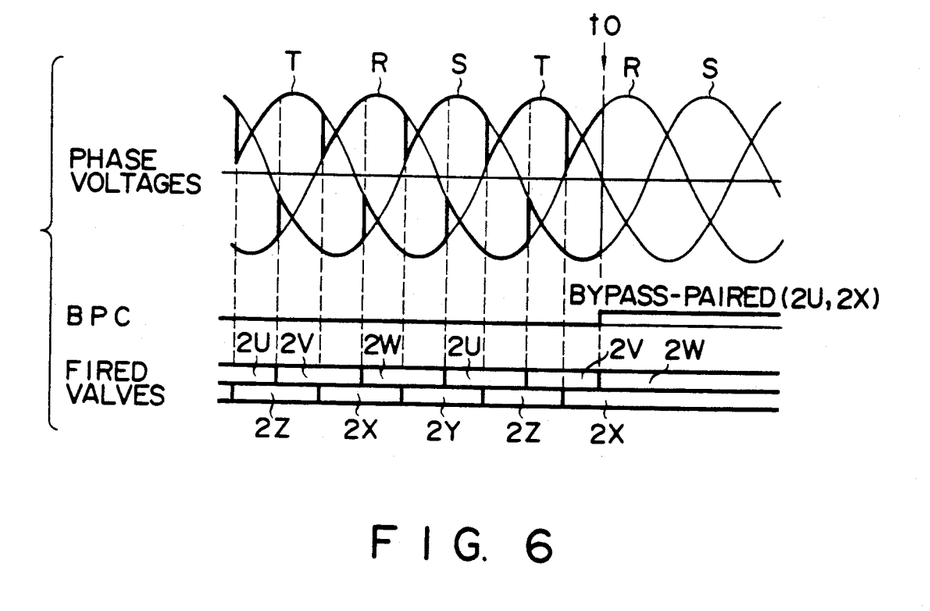
FIGS. 6-17 are waveform diagrams for explaining other bypass-pair operations of the circuit shown in FIG. 4.
Figure 7:
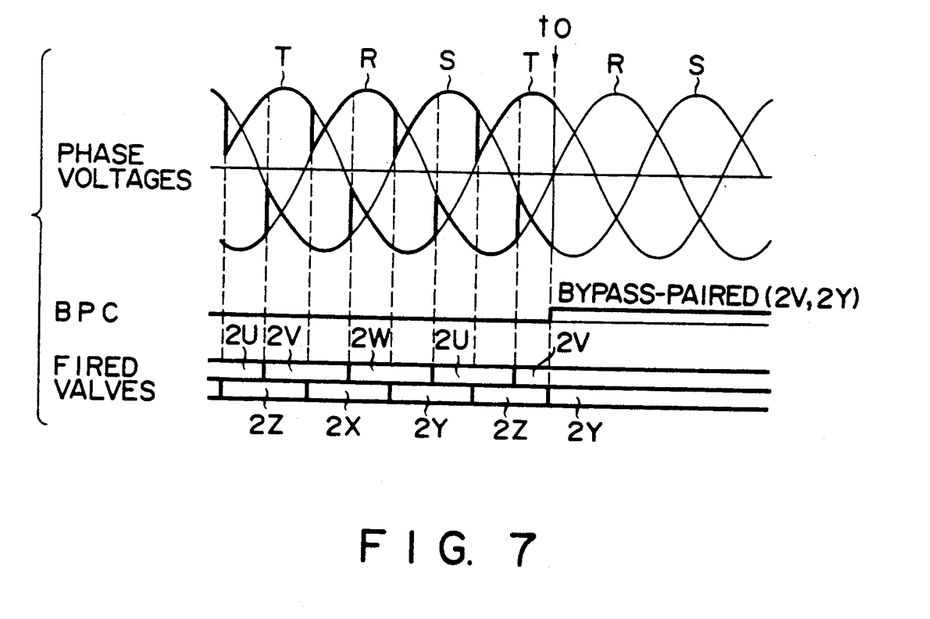
Figure 8:
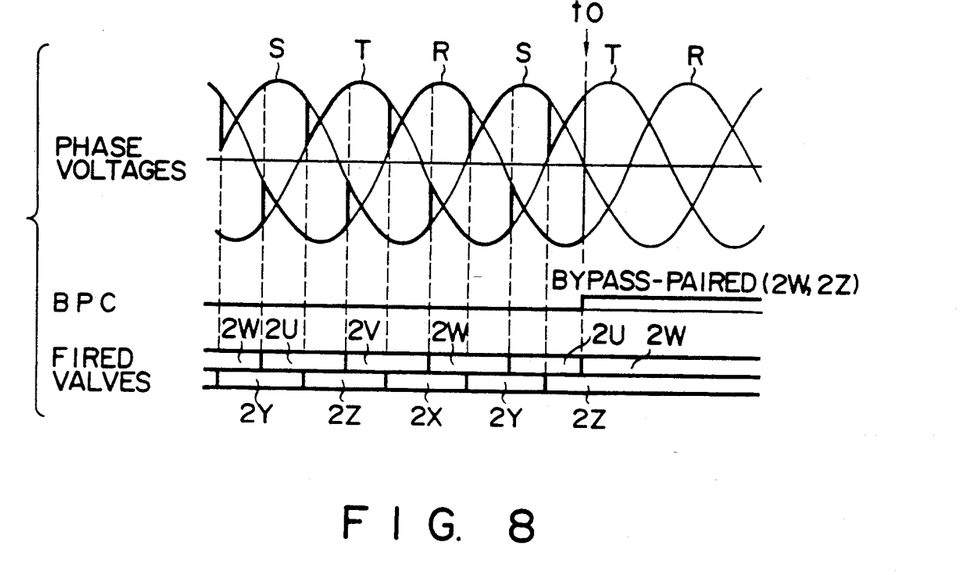
Figure 9:
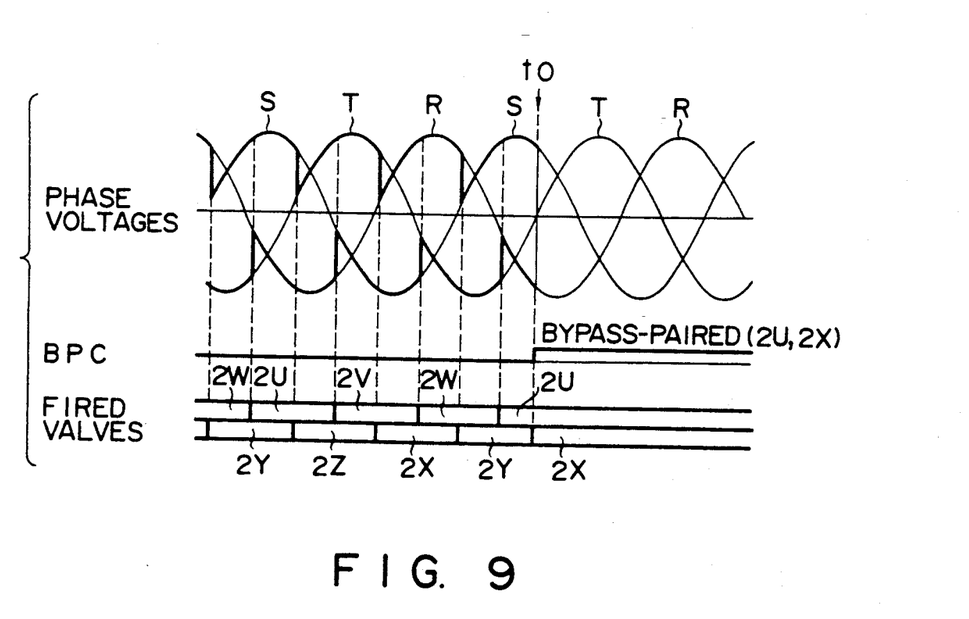
Figure 10:
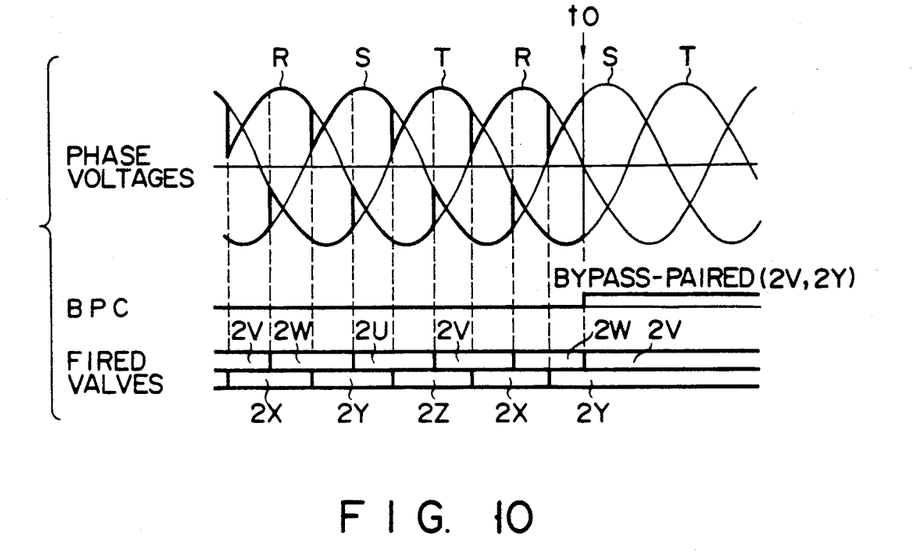
Figure 11:
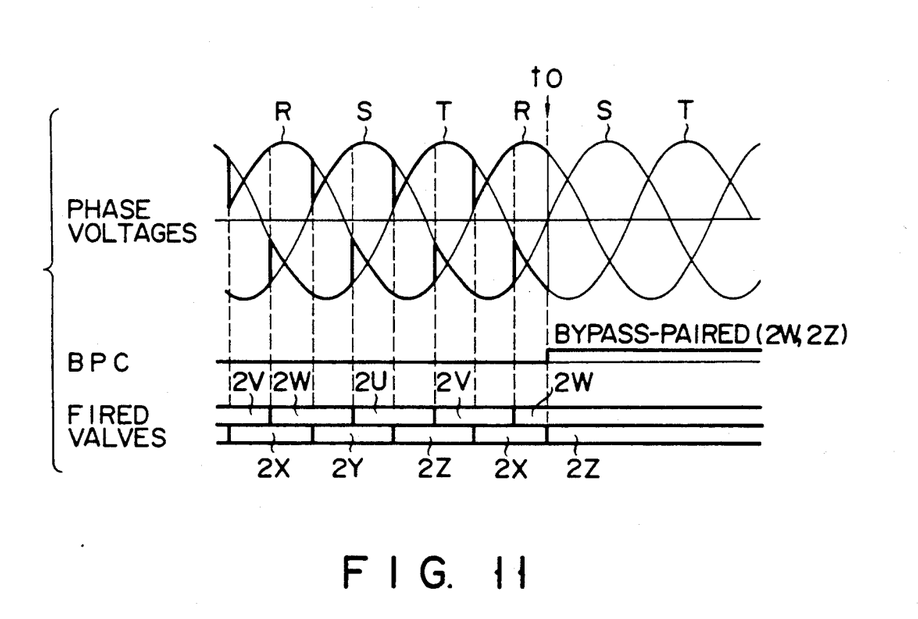
Figure 12:
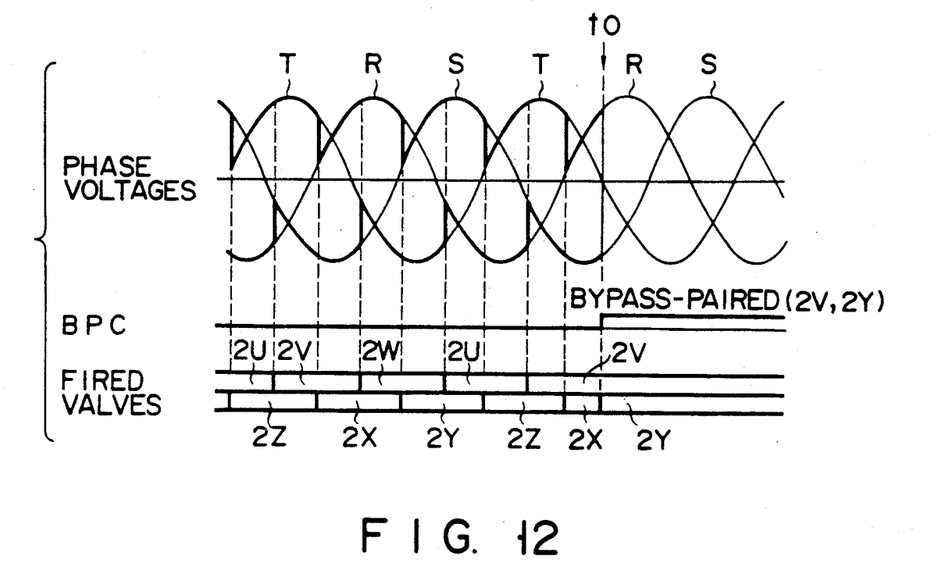
Figure 13:
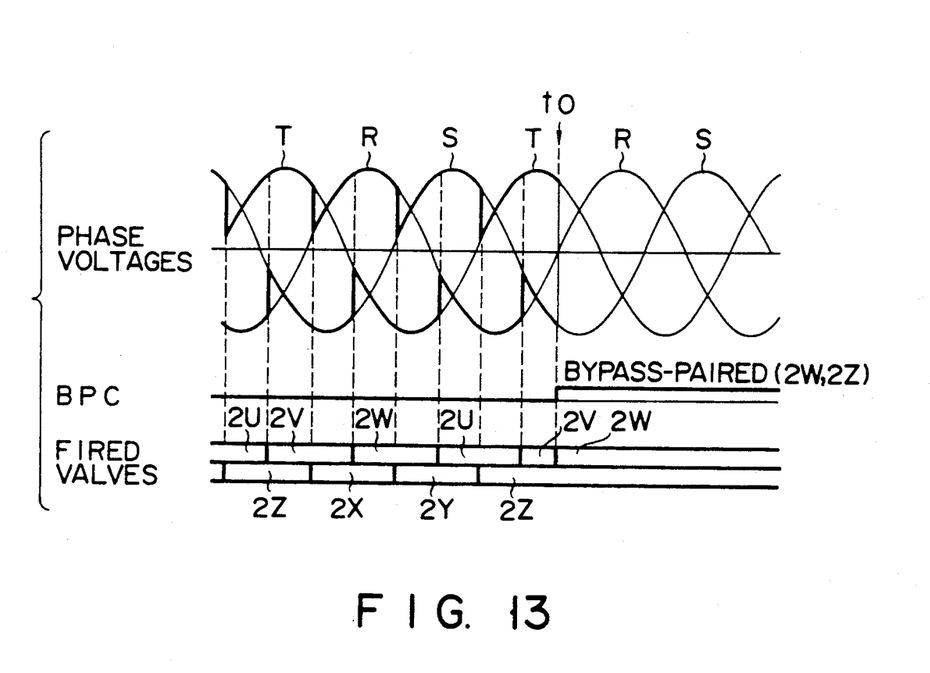
Figure 14:
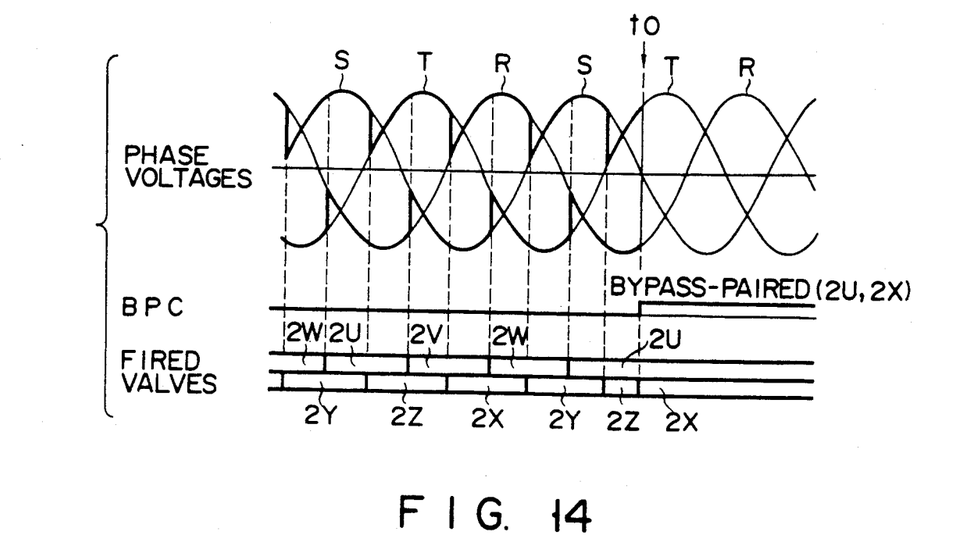
Figure 15:
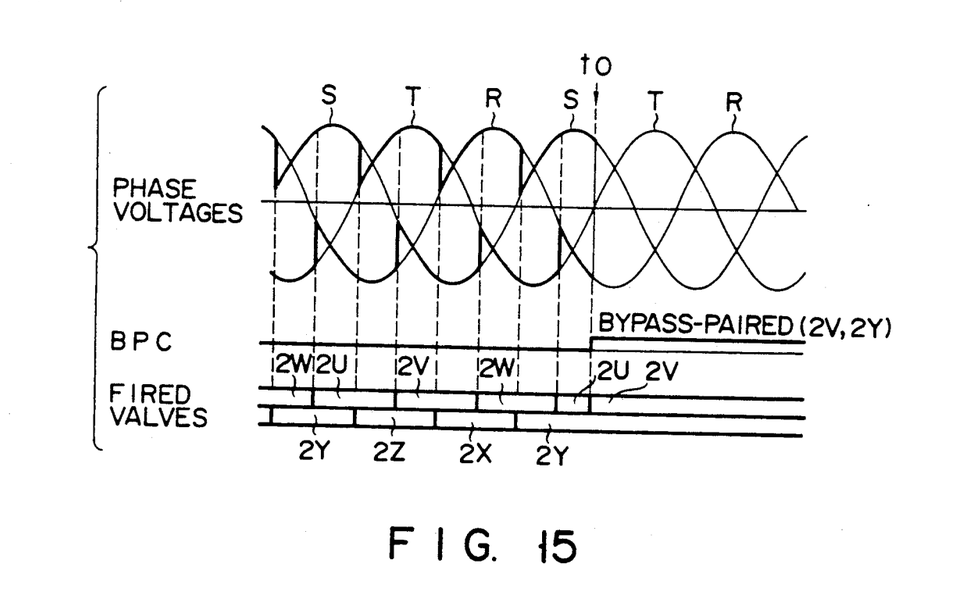
Figure 16:
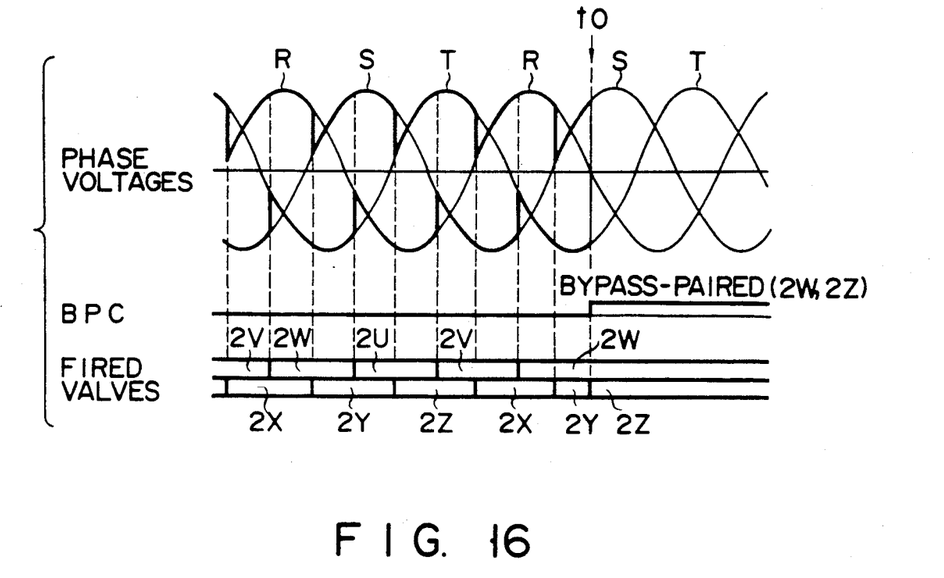

Assume now that flip-flops 131, 132, and 133 shown in FIG. 4 are all reset, and the X-phase valve and W-phase valve are set in the conduction state (in this state, if bypass-pair command BPC is input to AND gate 15, AND gates 121 to 123 are all opened or enabled). In this case, X-phase valve conduction signal VCS-X and W-phase valve conduction signal VCS-W are both set to logic "1" and output S104 of AND gate 104 and output S111 of OR gate 111 are both set to logic "1". At this time, assume that BPP command BPC is set to "1" (at time t0 in FIG. 5). Then, output S15 of AND gate 15 is set to "1", and output S121 of AND gate 121 is set to "1", so that output BP-UX of flip-flop 131 is set to logic "1", i.e., a command (S9A or S9B) for setting the U-phase valve and X-phase valve into the BPP operation is output.

If, in this state, BP-UX is set to "1", output S14 of NOR gate 14 is set to "0" and output S15 of AND gate 15 is also set to "0" so that gates 121 to 123 are all disabled and the other flip-flops 132 and 133 cannot be set. Then, the BPP commands (S9A and S9B) are set to the same signal (in this example, BP-UX) so that both control units 4A and 4B can select the same valve (U, X phase) for BPP.

FIGS. 6-17 are waveform diagrams for explaining various bypass-pair operations performed by bypass-pair logic 9A or 9B in FIG. 2.

Figure 17:
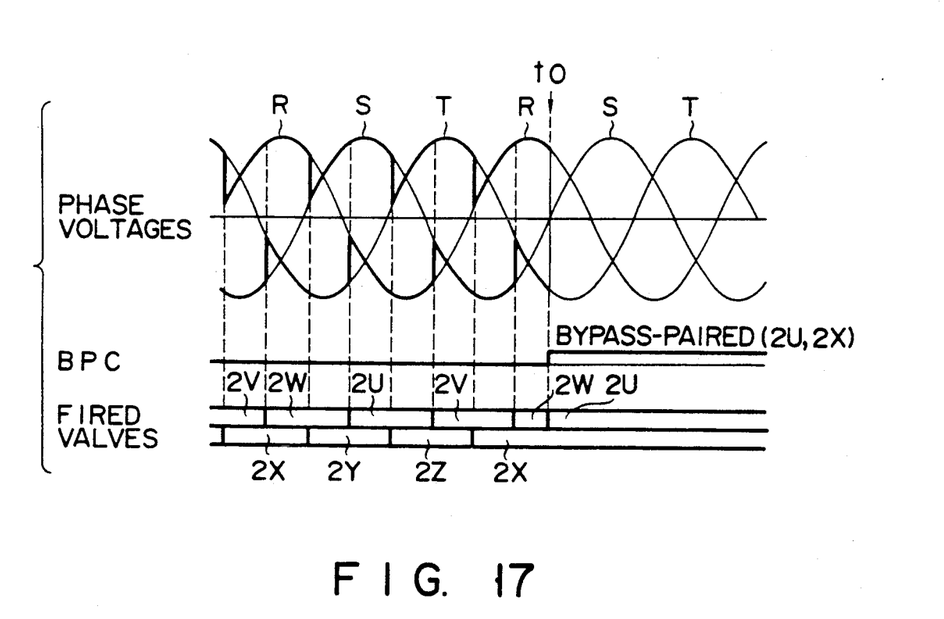

In each example of FIGS. 6, 9, 14, and 17, thyristor valves 2U and 2X are selected for the bypass-pair. However, the timings of the bypass-pair operation with respect to phase voltages R, S, and T are different in the examples of FIGS. 6, 9, 14, and 17. (The timing of FIG. 17 is the same as that of FIG. 5.)

In each example of FIGS. 7, 10, 12, and 15, thyristor valves 2V and 2Y are selected for the bypass-pair. However, the timings of the bypass-pair operation with respect to phase voltages R, S, and T are different in the examples of FIGS. 7, 10, 12, and 15.

In each example of FIGS. 8, 11, 13, and 16, thyristor valves 2W and 2Z are selected for the bypass-pair. However, the timings of the bypass-pair operation with respect to phase voltages R, S, and T are different in the examples of FIGS. 8, 11, 13, and 16.

Various logic circuits which can set up the same input/output relation as the logic of FIG. 4 and are different from the logic circuit of FIG. 4 can be provided. Further, the logic circuit is not limited to the hardware of FIG. 4. This logic can be reduced to practice by software using a microcomputer or the like.

In the above embodiment, although the duplex system is explained, a multiplex system having three or more series can be used in the same manner (in a triplex system, 4C, 5C, 8C, and 9C having the same construction as 4A, 5A, 8A, and 9A may be additionally provided. In this case, optical fibers 6 and 7 of 3-branch type are used.

Further, two valve conduction detectors of A- and B-series are used, but a single valve conduction detector may be used and an output thereof may be distributed to control units 4A and 4B.

Further, this invention can be applied to a thyristor bridge dealing with another AC other than the 3-phase current (for example, single phase current).

As described above, according to this invention, since at least two series of control units select the same pair of valves for BPP, it becomes possible to prevent occurrence of a problem that a valve specified by the BPP command of one of the control units is different from an actual bypass-pair valve and the normal BPP operation cannot be effected.

The following U.S. patents disclose the technique to which the present invention can be applied. They are incorporated into this application.

(1) U.S. Pat. No. 4,680,691 dated Jul. 14, 1987, Yoshino et al.; and
(2) U.S. Pat. No. 4,859,884 dated Aug. 22, 1989, Yoshino.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A bypass-pair control apparatus having two or more series of firing control effecting systems each for effecting a firing control of a bridge constructed by a plurality of switch valves, comprising:
    detecting means for detecting conduction states of said switch valves to generate conduction signals corresponding to the detected conduction state;
    producing means, responsive to a given bypass-pair command, for producing at least two kinds of bypass-pair signals corresponding to a combination of two of said conduction signals;
    fixing means, responsive to a given bypass-pair release command, for fixing a state of production of said bypass-pair signal after the bypass-pair signal has been produced unless the bypass-pair release command is supplied;
    first means for determining which of said switch valves is to be fired based on said bypass-pair signal whose production state is fixed, said first means constituting one series of the firing control effecting systems; and
    second means for determining which of said switch valves is to be fired based on said bypass-pair signal whose production state is fixed, said second means constituting another one series of the firing control effecting system.

2. An apparatus according to claim 1, wherein said producing means includes:
    means for providing said bypass-pair signals in response to given set signals, and stopping the providing of said bypass-pair signals when said bypass-pair release command is given,
    and said fixing means includes:
    means for generating intermediate signals each representing a predetermined combination of said conduction signals; and
    means for selectively changing said intermediate signals to said set signals in response to a condition that none of said bypass-pair signals is provided by said providing means and said bypass-pair command is given.

3. An apparatus according to claim 1, wherein said producing means includes:
    means for providing said bypass-pair signals in response to given set signals, and stopping the providing of said bypass-pair signals when said bypass-pair release command is given,
    and said fixing means includes:
    means for generating said set signals in response to a predetermined combination of said conduction signals under a condition that none of said bypass-pair signals is provided by said providing means and said bypass-pair command is given.

4. An apparatus according to claim 1, wherein said producing means includes:
    means for providing one of said bypass-pair signals in response to a given set signal,
    and said fixing means includes:
    means for generating said set signal in response to a predetermined combination of two of said conduction signals under a condition that none of said bypass-pair signals is provided and said bypass-pair command is given.

5. An apparatus according to claim 1, wherein said producing means includes:
    first providing means for providing a first one of said at least two kinds of bypass-pair signals in response to a first set signal,
    and said fixing means includes:
    first generating means for generating said first set signal in response to a first combination of two of said conduction signals under a condition that none of said bypass-pair signals is provided and said bypass-pair command is given.

6. An apparatus according to claim 5, wherein said producing means further includes:
    second providing means for providing a second one of said at least two kinds of bypass-pair signals in response to a second set signal,
    and said fixing means further includes:
    second generating means for generating said second set signal in response to a second combination of two of said conduction signals under a condition that none of said bypass-pair signals is provided and said bypass-pair command is given.

7. An apparatus according to claim 6, wherein said producing means further includes:

third providing means for further providing third kind of bypass-pair signals in response to a third set signal, and said fixing means further includes:

third generating means for generating said third set signal in response to a third combination of two of said conduction signals under a condition that none of said bypass-pair signals is provided and said bypass-pair command is given.

8. A bypass-pair control apparatus having at least two series of systems for effecting a firing control of switch valves, comprising:

means for detecting conduction states of said switch valves to generate conduction signals corresponding to the detected conduction states;

means for producing a bypass-pair signal corresponding to a combination of said conduction signals;

means for fixing a state of production of said bypass-pair signal after the bypass-pair signal has been produced;

first means for determining which of said switch valves is to be fired based on said bypass-pair signal whose production state is fixed, said first means constituting one series of the firing control effecting systems; and second means for determining which of said switch valves is to be fired based on said bypass-pair signal whose production state is fixed, said second means constituting another one series of the firing control effecting systems.

9. A bypass-pair control apparatus comprising:

means for detecting conduction states of switch valves to generate conduction signals corresponding to the detected conduction states;

means, responsive to a given bypass-pair command, for producing at least two kinds of bypass-pair signals corresponding to a combination of two of said conduction signals;

means, responsive to a given bypass-pair release command, for fixing a state of production to said bypass-pair signal after the bypass-pair signal has been produced unless the bypass-pair release command is supplied;

first means for determining which of said switch valves is to be fired based on said bypass-pair signal whose production state is fixed; and second means for determining which of said switch valves is to be fired based on said bypass-pair signal whose production state is fixed.

* * * * *